United States Patent [19]

Takahashi et al.

[11] Patent Number: 5,087,983
[45] Date of Patent: Feb. 11, 1992

[54] LIGHT SCANNING DEVICE

[75] Inventors: Yasushi Takahashi, Iwate; Kenichi Takanashi, Yokohama, both of Japan

[73] Assignee: Ricoh Company, Ltd., Tokyo, Japan

[21] Appl. No.: 431,673

[22] Filed: Nov. 2, 1989

Related U.S. Application Data

[63] Continuation of Ser. No. 70,790, Jul. 6, 1987, abandoned.

[30] Foreign Application Priority Data

Jul. 8, 1986 [JP] Japan .................. 61-160604

[51] Int. Cl.$^5$ .............. G02B 26/10; G02B 3/06; G02B 13/08
[52] U.S. Cl. .................. 359/205; 359/668; 359/711
[58] Field of Search ............. 350/6.8, 434, 6.7, 420

[56] References Cited

U.S. PATENT DOCUMENTS

| | | | |
|---|---|---|---|
| 4,277,128 | 7/1981 | Kawamura | 350/6.8 |
| 4,674,825 | 6/1987 | Tateoka et al. | 350/6.8 |
| 4,715,699 | 12/1987 | Morimoto | 350/6.8 |
| 4,756,584 | 7/1988 | Takanashi | 350/6.8 |

FOREIGN PATENT DOCUMENTS

| | | | |
|---|---|---|---|
| 54-126051 | 9/1979 | Japan | 350/6.8 |
| 57-144515 | 9/1982 | Japan | 350/6.8 |
| 58-100815 | 6/1983 | Japan | 350/6.8 |
| 58-132719 | 8/1983 | Japan | 350/6.8 |
| 59-147316 | 8/1984 | Japan | 350/6.8 |
| 60-100118 | 6/1985 | Japan | 350/6.8 |

OTHER PUBLICATIONS

Fleischer et al., "Laser-Optical System of The IBM 3800 Printer," *IBM Journal of Research and Development,* vol. 21, No. 5, Sep., 1977.

*Primary Examiner*—Bruce Y. Arnold
*Assistant Examiner*—Martin Lerner
*Attorney, Agent, or Firm*—Cooper & Dunham

[57] ABSTRACT

A light deflector has a focusing optical system for focusing a light beam deflected by a light deflector onto an object surface. The focusing optical system comprises, in order from the light deflector, a single anamorphic lens, a single spherical lens having a positive refractive index, and a single lens having a toric surface, the lenses having refracting surfaces having respective radii of curvature indicated respectively by r:1, r:2, r:3, r:4, r:5, r:6 in order from the light deflector. The light deflector meets the following condition:

$$-1.0 < r\text{:}6Y/r\text{:}2Y < -0.3$$

where Y is a component of each of the radii of curvature in a direction normal to a main scanning direction in which the light beam is deflected.

2 Claims, 9 Drawing Sheets

LIGHT SCANNING DEVICE

This is a continuation of application Ser. No. 070,790, filed July 6, 1987, now abandoned.

BACKGROUND OF THE INVENTION

The present invention relates to a light scanning device for use in a laser printer, a facsimile transmitter/receiver, a platemaking machine, or the like.

Light scanning devices employing a light deflector such as a rotating polygonal mirror for deflecting a light beam at a constant angular speed are used in laser printers, facsimile transmitter/receivers, platemaking machines, and the like. If the reflection surface of the light deflector had an accuracy error, the direction of travel of the deflected light beam would vary in a plane normal to a deflection plane that is formed by a line perpendicular to the reflection surface as it is angularly moved, resulting in pitch irregularities of the scanning line on a scanned surface and hence in low image quality. In view of this problem, there have been proposed various optical scanning systems for preventing pitch irregularities of the scanning line on a scanned surface even when the direction of travel of the deflected light beam varies in a plane normal to the deflection plane. Examples of such proposed optical scanning systems are disclosed in Japanese Laid-Open Patent Publications Nos. 59-147316 and 60-100118.

The arrangement shown in Japanese Laid-Open Patent Publication No. 59-147316 can provide a large deflection angle, but fails to sufficiently correct the curvature of field in both main and auxiliary scanning directions, with the result that a high-density spot diameter cannot be achieved. While field curvature in the main scanning direction can well be corrected in Japanese Laid-Open Patent Publication No. 60-100118, much consideration is not given to removal of pitch irregularities of the scanning line.

SUMMARY OF THE INVENTION

In view of the aforesaid drawbacks of the conventional light scanning devices, it is an object of the present invention to provide a light scanning device which has compact focusing optical systems, is capable of correcting errors resulting from inclined reflection surfaces of a light deflector, allows a light beam to scan an object surface at a constant speed, and can focus a light beam at a highly reduced width (curvature of field) in a direction (auxiliary scanning direction) normal to the direction (main scanning direction) in which the light beam is deflected or scanned.

According to the present invention, a light deflector includes a second focusing optical system for focusing a light beam deflected by a light deflector onto an object surface, the second focusing optical system comprising, in order from the light deflector, a single anamorphic lens, a single spherical lens having a positive refractive index, and a single lens having a toric surface, the lenses having refracting surfaces having respective radii of curvature indicated respectively by r:1, r:2, r:3, r:4, r:5, r:6 in order from the light deflector, the light deflector meeting the following condition:

$$-1.0 < r{:}6Y/r{:}2Y < -0.3$$

where Y is a component of each of the radii of curvature in a direction normal to a main scanning direction in which the light beam is deflected.

By selecting the components of the radii of curvature of the second and sixth refracting surfaces of the second focusing optical system in the direction normal to the main scanning line so as to meet the above condition, the curvature of field can be reduced for achieving a high-density light spot which scans the object surface. The second focusing optical system which comprises, in order from the light deflector, a single anamorphic lens, a single spherical lens having a positive refractive index, and a single lens having a toric surface, as described above, can eliminate a second cylindrical lens which has heretofore been required between an fθ lens and an object surface to be scanned in a conventional light scanning device.

The above and other objects, features and advantages of the present invention will become more apparent from the following description when taken in conjunction with the accompanying drawings in which a preferred embodiment of the present invention is shown by way of illustrative example.

DETAILED DESCRIPTION

FIGS. 1 through 4 schematically show, in principle, the general arrangement of a light scanning device according to the present invention.

A light beam emitted from a light source assembly 1 which may comprise a light source only or a combination of a light source and a condenser is focused into a linear image or a line of light by a first focusing optical system 2 comprising a cylindrical lens. A light deflector 3 having a plurality of deflecting reflection surfaces 4 is positioned near the location where the light beam is focused by the first focusing optical system 2. The light deflector 3 comprises a rotating polygonal mirror that is rotatable about its own axis. When the light deflector 3 rotates, the light beam applied as a line of light to the light deflector 3 is deflected successively by the deflecting reflection surfaces 4 in a direction normal to the axis of rotation of the light deflector 3, i.e., in a main scanning direction. The line of light or linear image focused on the light deflector 3 by the second focusing optical system 2 extends in the main scanning direction.

Between the light deflector 3 and an object surface 8 to be scanned, there is disposed a focusing lens system or second focusing optical system for focusing the light beam deflected by the light deflector 3 onto the object surface 8. The focusing lens system comprises, in order from the light deflector 3, a single anamorphic lens 5, a single lens 6 having positive refracting power, and a single lens 7 having a toric surface, the focusing lens system serving as an $f\theta$ lens system. The focusing lens system forms a focused light spot on the object surface 8. Upon rotation of the light deflector 3, the light spot scans the object surface 8 in a main scanning direction at a constant speed.

Figure 1:
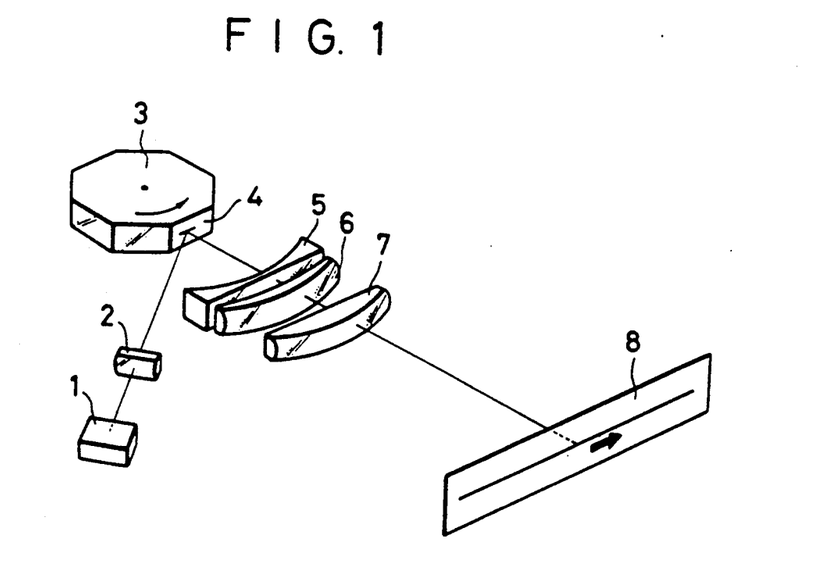
FIG. 1 is a perspective view showing, in principle, the general arrangement of a light scanning device according to the present invention.
Figure 2:
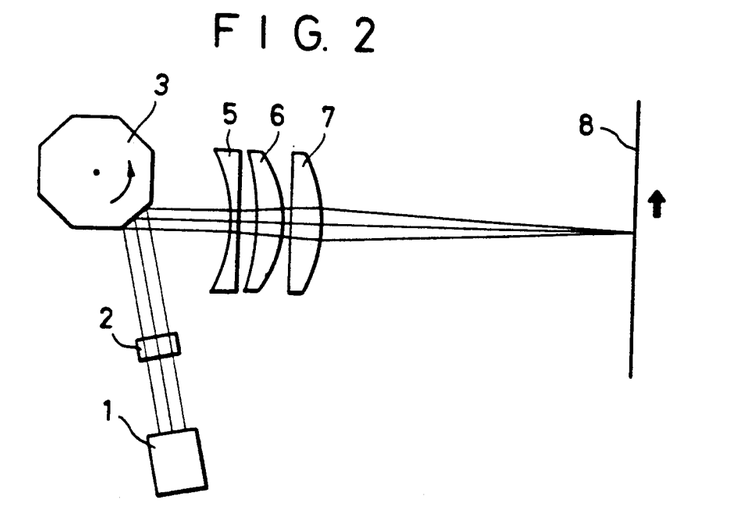
FIG. 2 is a plan view of the light scanning device.
Figure 3:
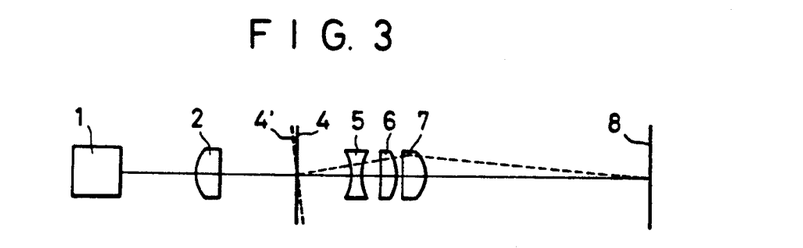
FIG. 3 is a front elevational view of the light scanning device.
Figure 4:
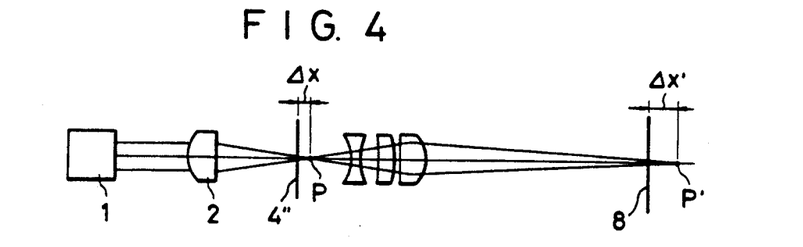
FIG. 4 is a view similar to FIG. 3, illustrating the relationship a linear image and its conjugate image.

FIG. 3 shows how to correct an influence or error due to an inclined deflecting reflection surface of the light deflector 3. The refracting power of the single lenses 5, 7 in an auxiliary scanning direction (which is a vertical direction in FIG. 3) is different from the refracting power of the lenses 5, 7 in the main scanning direction (which is a vertical direction in FIG. 2). The lenses 5, 6, 7 are positioned such that the deflecting reflecting surface 4 as it reflects the light beam and the object surface 8 are substantially in optically conjugate relationship to each other. Therefore, even if a deflecting reflection surface of the light deflector 3 is inclined with respect to the vertical direction as indicated at 4' in FIG. 3, a light beam passing through the lenses 5, 6, 7 as indicated by the broken line is focused substantially in the same spot on the object surface 8 though it deviates from the central optical axis of the lens system on travel to the object surface 8. Thus, an undesired influence or error due to an inclined deflecting reflection surface is corrected.

Where the light deflector 3 is a rotating polygonal mirror as illustrated, the axis of rotation thereof does not lie on the deflecting reflection surfaces 4 because of structural limitations of the light deflector 3. Therefore, as shown in FIG. 4, the distance $\Delta x$ between a position P where the linear image is focused by the first focusing optical system 2 and a deflecting reflection surface 4" varies as the light deflector 3 rotates. The conjugate image of the linear image formed in the position P is formed in a position P' which is spaced $\Delta x'$ from the object surface 8. The distance $\Delta x'$ can be expressed by:

$$\Delta x' = \beta^2 \cdot \Delta x \quad (1)$$

where $\beta$ is the magnification of the image formed by the lenses 5, 6, 7.

Figure 5:
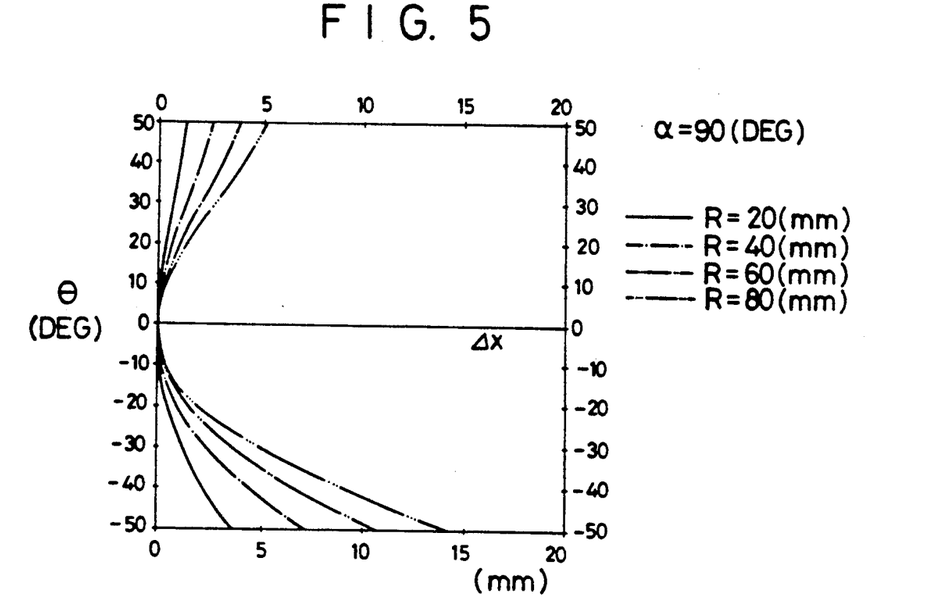
FIG. 5 is a graph showing the relationship between the angle of deflection and the distance between a focused linear image and a deflecting reflection surface, for each of different radii of inscribed circles of light deflectors.
Figure 6:
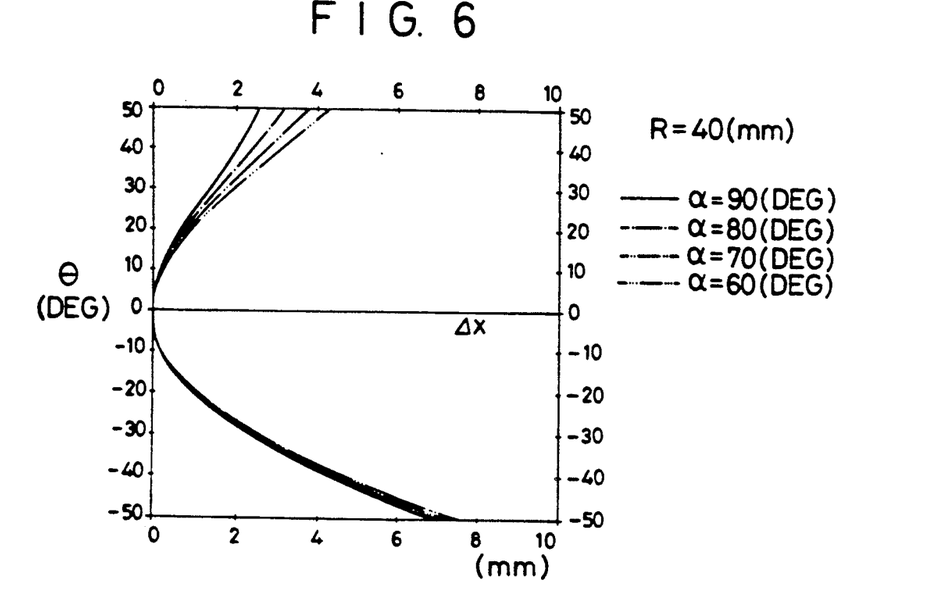
FIG. 6 is a graph showing the relationship between the angle of deflection and the distance between a focused linear image and a deflecting reflection surface, for each of different angles formed between a central light ray incident on a light deflector and the optical axis of a second focusing optical system.

FIGS. 5 and 6 show the relationship between the distance $\Delta x$ and an angle $\theta$ which is formed between the optical axis of the lens system and a central light beam axis in the plane of deflection as the light deflector 3 rotates. Denoted at R in FIGS. 5 and 6 is the radius of an inscribed circle of the light deflector 3 comprising a rotating polygonal mirror, and $\alpha$ is an angle formed between the central light beam applied to the light deflector 3 and the optical axis of the lenses 5, 6, 7 of the second focusing optical system. FIG. 5 illustrates the relationship between $\theta$ and $\Delta x$ when $\alpha$ remains constant, and FIG. 6 shows the relationship between $\theta$ and $\Delta x$ when R remains constant. As shown in FIG. 5, the distance $\Delta x$ becomes larger as the radius R of the inscribed circle of the rotating polygonal mirror is greater. The distance $\Delta x$ also varies as a function of $\alpha$ as shown in FIG. 6.

Unlike a galvanometer mirror, the axis of rotation of the rotating polygonal mirror is not aligned with the deflecting reflection surfaces. With the rotating polygonal mirror, the distance $\Delta x$ varies and so does the position of the focused linear image in a direction normal to the direction in which the linear image extends, upon rotation of the rotating polygonal mirror. Stated otherwise, the linear image position moves two-dimensionally and generally moves in an asymmetrical pattern with respect to the optical axis of the lens system upon rotation of the rotating polygonal mirror.

The light scanning device should therefore be arranged to well correct field curvature in both the main and auxiliary scanning directions throughout an effective scanning area. Any variations in the constant speed (linearity) at which the light beam scans the object surface should also be well corrected in the main scanning direction.

Figure 7:
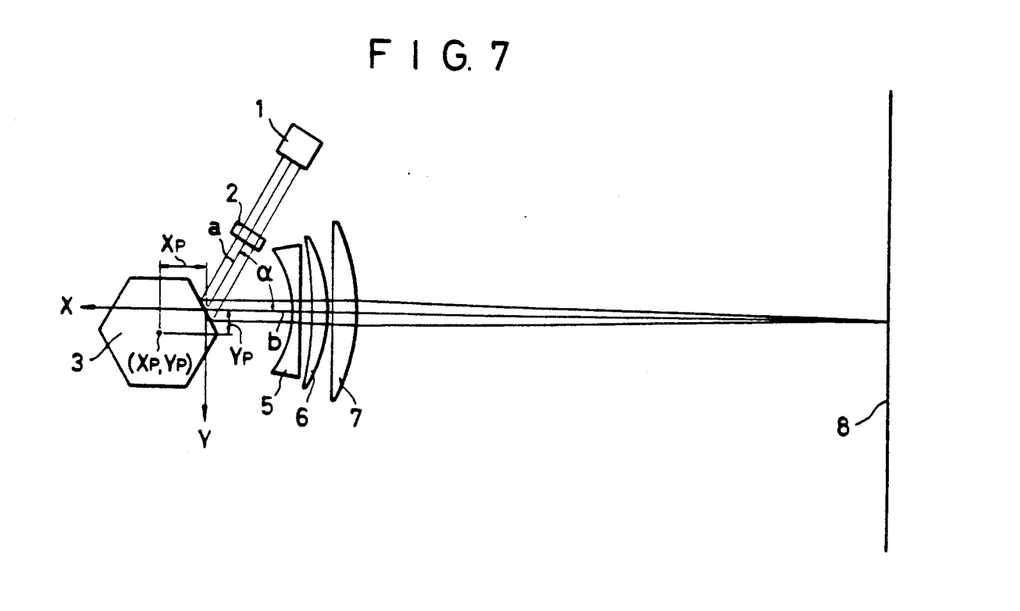
FIG. 7 is a view explaining various conditions of the light scanning device.

FIG. 7 is a view explanatory of various conditions to be met by the light scanning device, the view showing a cross section parallel to the plane of deflection. Denoted at a is a central line or axis of the light beam emitted from the light source assembly 1, and b is the optical axis of the lenses 5, 6, 7. Now it is assumed that the central line a and the optical axis b form an angle $\alpha$ therebetween, and the axis of rotation of the rotating polygonal mirror 3 has coordinates (Xp, Yp) in a rectangular coordinate system having its origin at the point where the central line a and the optical axis b intersect and its Y axis aligned with the optical axis b. The light deflecting device then meets the following conditions:

$$\theta < \alpha < \frac{4\pi}{N} - \theta \quad (2)$$

$$0 < Xp < R \cos \frac{\alpha}{2} \quad (3)$$

$$0 < Yp < R \sin \frac{\alpha}{2} \quad (4)$$

N in the condition (2) indicates the number of reflection surfaces of the rotating polygonal mirror 3. The lower limit of the condition (2) serves to keep the central line a out of an effective deflecting area of the $f\theta$ lens. The light beam applied to the object surface 8 is reflected and scattered by the object surface 8, and then reflected again by the rotating polygonal mirror 3 to form a ghost image on the object surface 8. The upper limit of the condition (2) serves to keep such a ghost image out of the effective deflecting area.

The conditions (3) and (4) serve to minimize variations in the distance between the linear image and the reflection surface as shown in FIGS. 5 and 6.

The lenses 5, 6, 7 have refracting surfaces having respective radii of curvature indicated respectively by r:1, r:2, r:3, r:4, r:5, r:6 in order from the rotating polygonal mirror 3. The curvature of field in the auxiliary scanning direction is corrected by meeting the following condition:

$$-1.0 < r:6Y/r:2Y < -0.3 \quad (5)$$

where Y is a component of each of the radii of curvature in the auxiliary scanning direction normal to the main scanning direction in which the light beam is deflected.

By meeting the aforesaid conditions, the field curvature can well be corrected in both the main and auxiliary scanning directions throughout the effective scanning area.

EXAMPLES

Examples of the light scanning device according to the present invention will be described below.

In these examples, r:1X through r:6X denote radii of curvature of the lenses of the second focusing optical system in a cross section parallel to the plane of deflection; r:1Y through r:6Y radii of curvature of the lenses of the second focusing optical system in a cross section normal to the plane of deflection; $d_1$, $d_3$, $d_5$ thicknesses of the lenses of the second focusing optical system on the optical axis; $d_2$, $d_4$ air gaps between the lenses on the optical axis; and $n_1$, $n_2$, $n_3$ refractive indexes, all in order from the light deflector.

Designated in the examples by R is the radius of an inscribed circle of the light deflector or rotating polygonal mirror, $\alpha$ an angle formed between the central line of a light beam incident on the rotating polygonal mirror and the optical axis of the lenses, f the combined focal length of the lens system in a plane parallel to the plane of deflection, $\theta$ the angle of deflection, and K the value of r:6Y/r:2Y.

1st Example:
f = 100, 2θ = 48° α = 60°
R/f = 0.120, K = −0.363
r:1X = −22.127, r:1Y = −22.127, $d_1$ = 2.154, $n_1$ = 1.51118
r:2X = ∞, r:2Y = 39.893, $d_2$ = 2.832
r:3X = −68.018, r:3Y = −68.018, $d_3$ = 3.391, $n_2$ = 1.51118
r:4X = −33.093, r:4Y = −33.093, $d_4$ = 0.638
r:5X = ∞, r:5Y = −128.057, $d_5$ = 5.027, $n_3$ = 1.82485
r:6X = −42.965, r:6Y = −14.481

2nd Example:
f = 100, 2θ = 48° α = 60°
R/f = 0.120, K = −0.754
r:1X = −22.129, r:1Y = −22.129, $d_1$ = 2.154, $n_1$ = 1.51118
r:2X = ∞, r:2Y = 18.750, $d_2$ = 2.832
r:3X = −68.208, r:3Y = −68.208, $d_3$ = 3.391, $n_2$ = 1.51118
r:4X = −33.099, r:4Y = −33.099, $d_4$ = 0.638
r:5X = ∞, r:5Y = −347.071, $d_5$ = 5.027, $n_3$ = 1.82485
r:6X = −43.005, r:6Y = −14.142

3rd Example:
f = 100, 2θ = 48° α = 60°
R/f = 0.120, K = −0.72
r:1X = −22.276, r:1Y = −22.276, $d_1$ = 2.055, $n_1$ = 1.51118
r:2X = ∞, r:2Y = 19.947, $d_2$ = 2.713
r:3X = −69.414, r:3Y = −69.414, $d_3$ = 3.271, $n_2$ = 1.51118
r:4X = −33.111, r:4Y = −33.111, $d_4$ = 0.638
r:5X = ∞, r:5Y = −374.997, $d_5$ = 5.505, $n_3$ = 1.82485
r:6X = −43.181, r:6Y = −14.362

4th Example:
f = 100, 2θ = 48° α = 60°
R/f = 0.120, K = −0.619
r:1X = −22.276, r:1Y = −22.276, $d_1$ = 1.995, $n_1$ = 1.51118
r:2X = ∞, r:2Y = 26.669, $d_2$ = 2.394
r:3X = −69.813, r:3Y = −69.813, $d_3$ = 3.670, $n_2$ = 1.51118
r:4X = −33.111, r:4Y = −33.111, $d_4$ = 0.638
r:5X = ∞, r:5Y = ∞, $d_5$ = 5.785, $n_3$ = 1.82485
r:6X = −43.418, r:6Y = −16.264

5th Example:
f = 100, 2θ = 48° α = 60°
R/f = 0.120, K = −0.605
r:1X = −22.340, r:1Y = −22.340, $d_1$ = 2.035, $n_1$ = 1.51118
r:2X = ∞, r:2Y = 27.072, $d_2$ = 2.194
r:3X = −70.212, r:3Y = −70.212, $d_3$ = 3.830, $n_2$ = 1.51118
r:4X = −33.231, r:4Y = −33.231, $d_4$ = 0.678
r:5X = ∞, r:5Y = ∞, $d_5$ = 5.984, $n_3$ = 1.82485
r:6X = −43.612, r:6Y = −16.376

6th Example:
f = 100, 2θ = 48° α = 60°
R/f = 0.120, K = −0.626
r:1X = −22.276, r:1Y = −22.276, $d_1$ = 2.058, $n_1$ = 1.51118
r:2X = ∞, r:2Y = 26.210, $d_2$ = 2.394
r:3X = −69.813, r:3Y = −69.813, $d_3$ = 3.710, $n_2$ = 1.51118
r:4X = −33.111, r:4Y = −33.111, $d_4$ = 0.678
r:5X = ∞, r:5Y = ∞, $d_5$ = 5.984, $n_3$ = 1.82485
r:6X = −43.589, r:6Y = −16.400

7th Example:
f = 100, 2θ = 48° α = 60°
R/f = 0.120, K = −0.622
r:1X = −22.460, r:1Y = −22.460, $d_1$ = 2.035, $n_1$ = 1.51118
r:2X = ∞, r:2Y = 26.369, $d_2$ = 2.234
r:3X = −70.930, r:3Y = −70.930, $d_3$ = 3.830, $n_2$ = 1.51118
r:4X = −33.311, r:4Y = −33.311, $d_4$ = 0.758
r:5X = ∞, r:5Y = ∞, $d_5$ = 5.984, $n_3$ = 1.82485
r:6X = −43.851, r:6Y = −16.408

8th Example:
f = 100, 2θ = 43.6° α = 50°
R/f = 0.141, K = −0.521
r:1X = −22.318, r:1Y = −22.318, $d_1$ = 1.884, $n_1$ = 1.51118
r:2X = ∞, r:2Y = 25.365, $d_2$ = 3.153
r:3X = −67.457, r:3Y = −67.457, $d_3$ = 2.826, $n_2$ = 1.51118
r:4X = −32.782, r:4Y = −32.782, $d_4$ = 1.123
r:5X = ∞, r:5Y = −120.486, $d_5$ = 4.167, $n_3$ = 1.82485
r:6X = −42.866, r:6Y = −13.208

9th Example:
f = 100, 2θ = 43.6° α = 60°
R/f = 0.167, K = −0.504
r:1X = −22.365, r:1Y = −22.365, $d_1$ = 1.921, $n_1$ = 1.51118
r:2X = ∞, r:2Y = 28.989, $d_2$ = 2.899
r:3X = −68.095, r:3Y = −68.095, $d_3$ = 2.935, $n_2$ = 1.51118
r:4X = −32.754, r:4Y = −32.754, $d_4$ = 1.268
r:5X = ∞, r:5Y = −204.735, $d_5$ = 4.493, $n_3$ = 1.82485
r:6X = −43.111, r:6Y = −14.621

10th Example:
f = 100, 2θ = 43.6° α = 60°
R/f = 0.181, K = −0.821
r:1X = −22.365, r:1Y = −22.365, $d_1$ = 1.921, $n_1$ = 1.51118
r:2X = ∞, r:2Y = 18.154, $d_2$ = 2.899
r:3X = −68.095, r:3Y = −68.095, $d_3$ = 2.935, $n_2$ = 1.51118
r:4X = −32.754, r:4Y = −32.754, $d_4$ = 1.268
r:5X = ∞, r:5Y = ∞, $d_5$ = 4.493, $n_3$ = 1.82485
r:6X = −43.111, r:6Y = −14.911

11th Example:
f = 100, 2θ = 43.6° α = 50°
R/f = 0.185, K = −0.800
r:1X = −22.365, r:1Y = −22.365, $d_1$ = 1.921, $n_1$ = 1.51118
r:2X = ∞, r:2Y = 18.843, $d_2$ = 2.899
r:3X = −68.095, r:3Y = −68.095, $d_3$ = 2.935, $n_2$ = 1.51118
r:4X = −32.754, r:4Y = −32.754, $d_4$ = 1.268
r:5X = ∞, r:5Y = ∞, $d_5$ = 4.493, $n_3$ = 1.82485
r:6X = −43.111, r:6Y = −15.074

Figure 8:
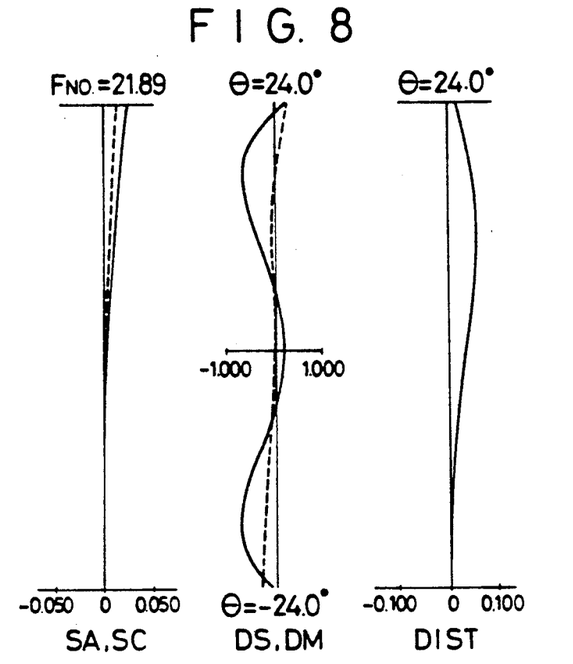
FIG. 8 is a set of diagrams of aberrations of a first example.
Figure 9:
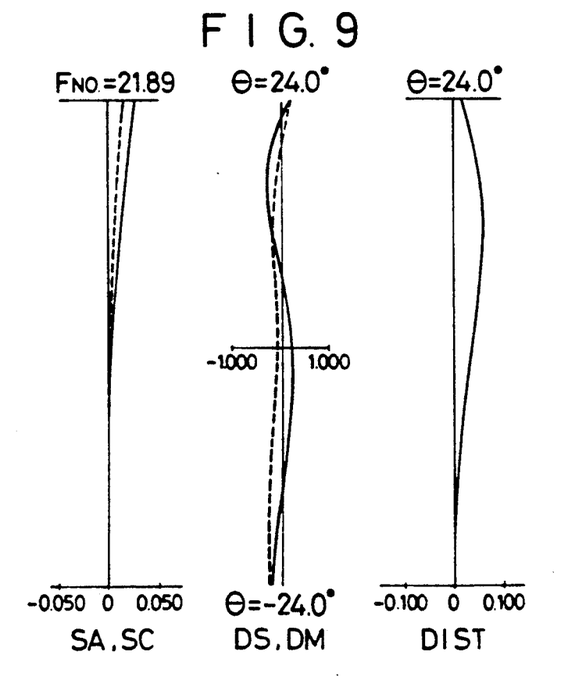
FIG. 9 is a set of diagrams of aberrations of a second example.
Figure 10:
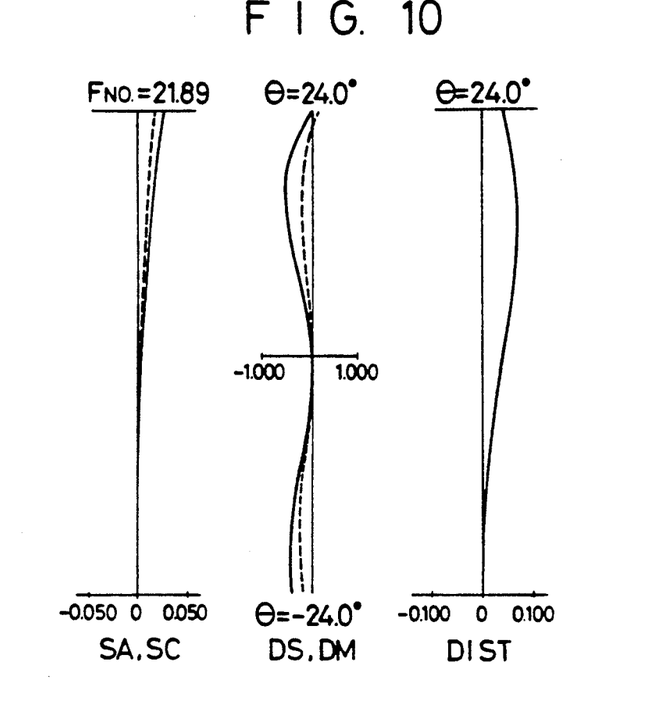
FIG. 10 is a set of diagrams of aberrations of a third example.
Figure 11:
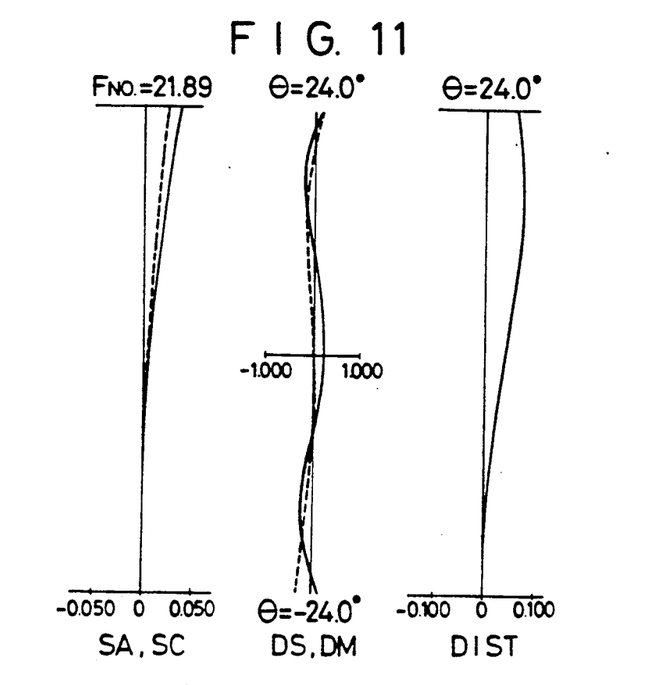
FIG. 11 is a set of diagrams of aberrations of a fourth example.
Figure 12:
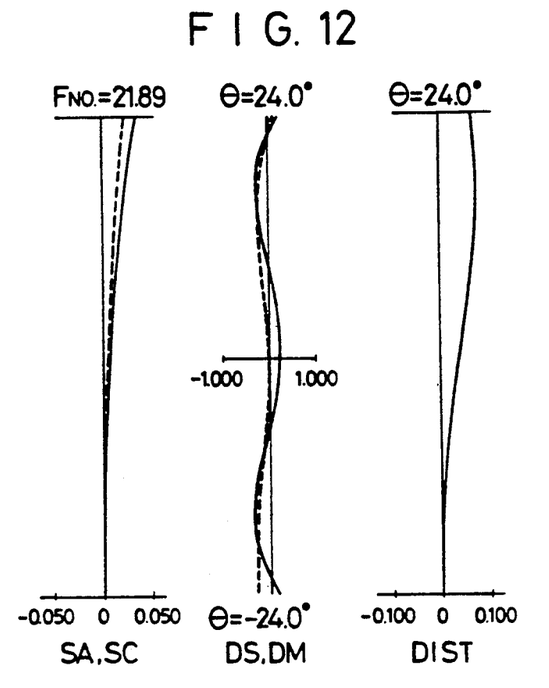
FIG. 12 is a set of diagrams of aberrations of a fifth example.
Figure 13:
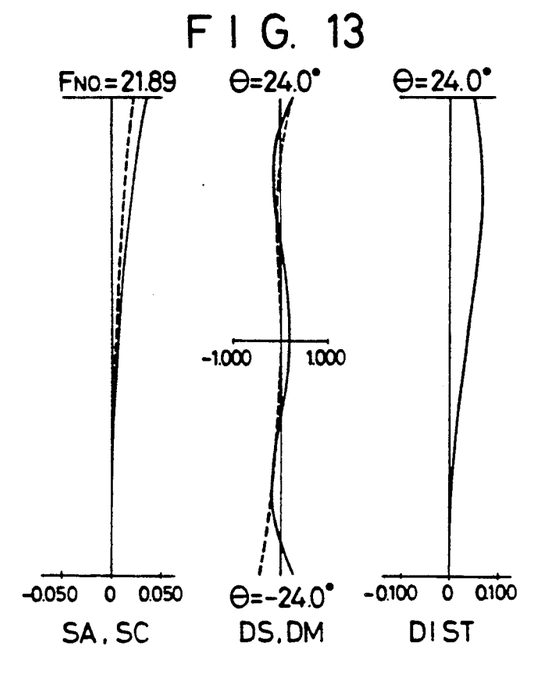
FIG. 13 is a set of diagrams of aberrations of a sixth example.
Figure 14:
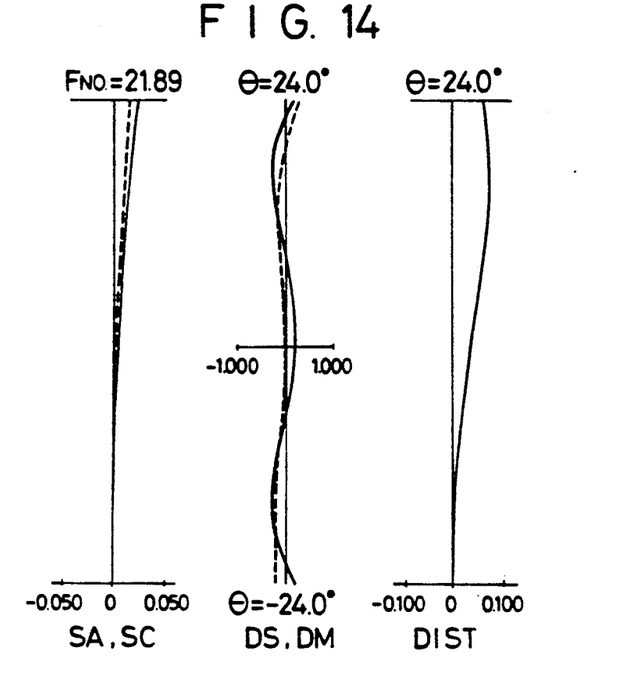
FIG. 14 is a set of diagrams of aberrations of a seventh example.
Figure 15:
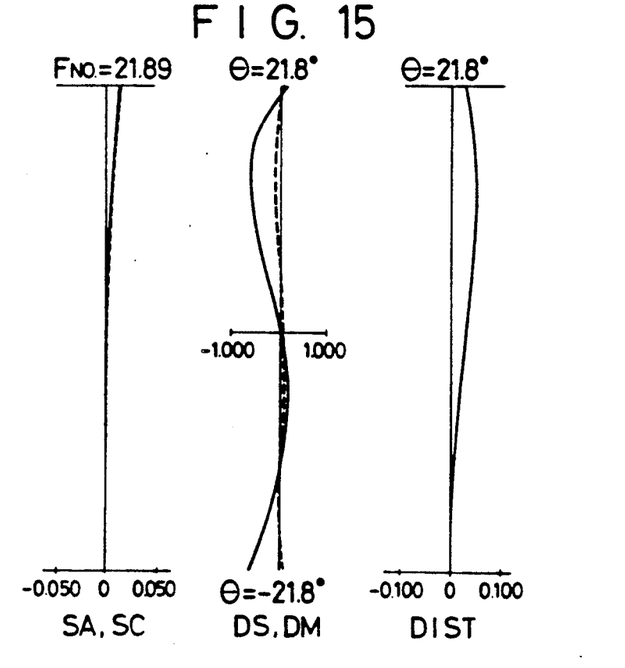
FIG. 15 is a set of diagrams of aberrations of an eighth example.
Figure 16:
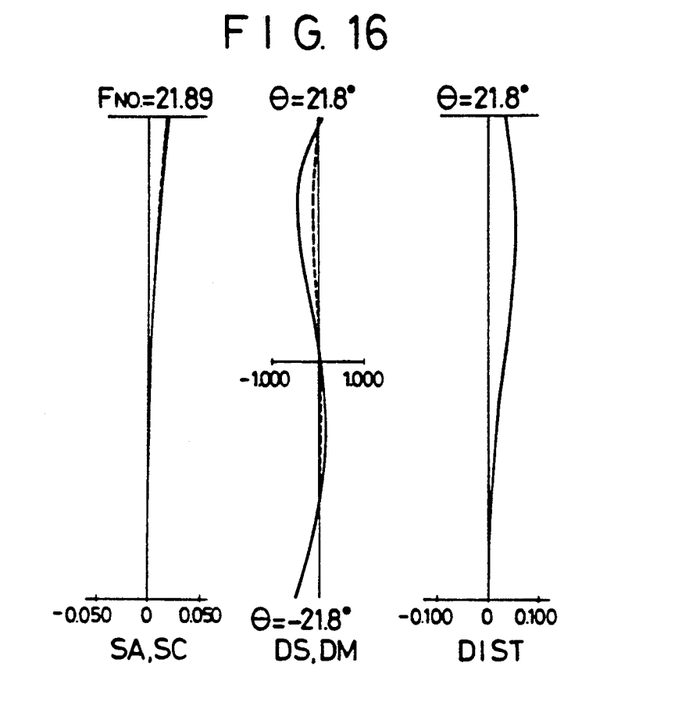
FIG. 16 is a set of diagrams of aberrations of a ninth example.
Figure 17:
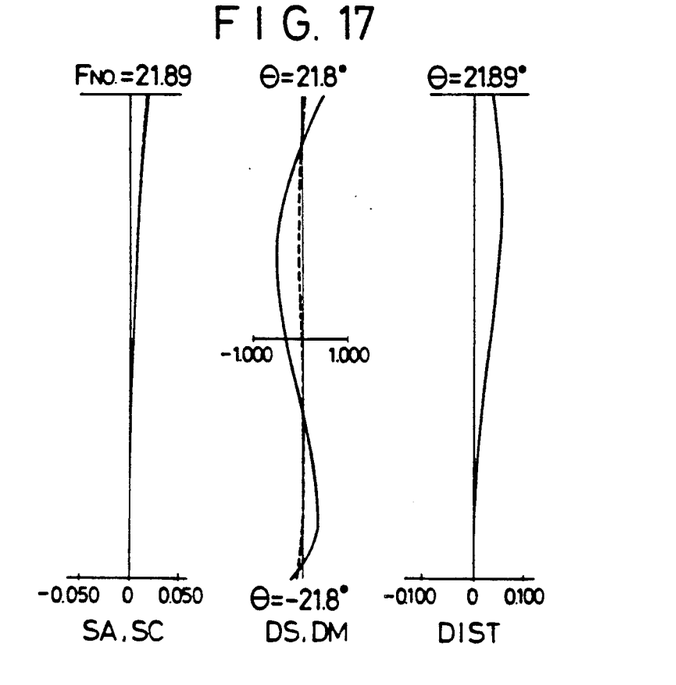
FIG. 17 is a set of diagrams of aberrations of a tenth example.
Figure 18:
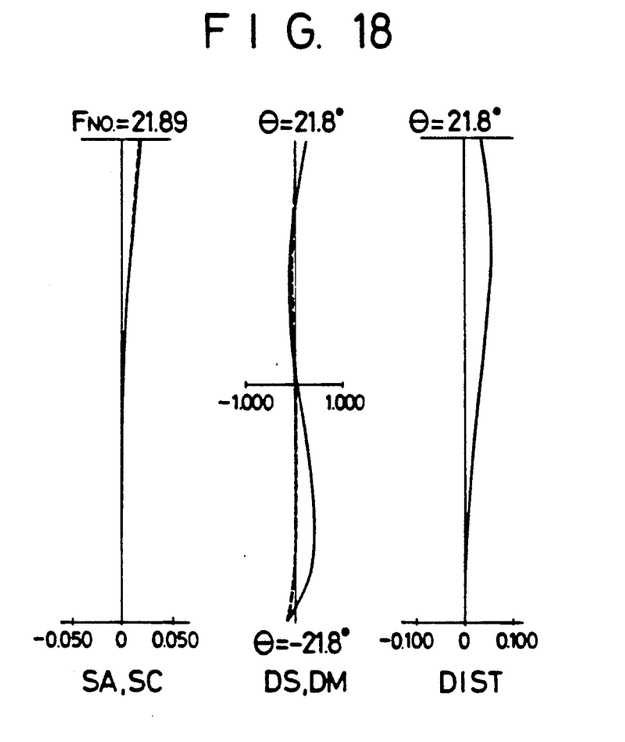
FIG. 18 is a set of diagrams of aberrations of an eleventh example.

FIG. 8 shows aberrations of the light scanning device according to the first example. The curvature of field indicated by the solid line is in the auxiliary scanning direction, and the curvature of field indicated by the dotted line is in the main scanning direction.

The fθ characteristic is a quantity indicative of the linearity of the light beam. Assuming that an ideal image height is represented by f×θ and a real image height by h', the fθ characteristic can be given by:

$$f\theta \text{ characteristric} = \frac{h' - f \times \theta}{f \times \theta} \times 100 \ (\%)$$

Since the field curvature is asymmetric due to variations in the applied light beam which are caused by the light deflector, it is shown throughout the entire deflection area.

FIGS. 9 through 18 illustrate aberrations of the light scanning devices according to the second through eleventh examples. In FIGS. 8 through 14, f=250.669, and in FIGS. 15 through 18, f=275.966.

Although a certain preferred embodiment has been shown and described, it should be understood that many changes and modifications may be made therein without departing from the scope of the appended claim.

What is claimed is:

1. A scanning optical system capable of correcting deflecting surface irregularity, comprising:

a light source for emitting a light beam;

a first focusing optical system for focusing the light beam as a linear image;

a light deflector having a deflecting surface in the vicinity of the linear image formed by said first focusing optical system, for deflecting the light beam from said first focusing optical system; and a second focusing optical system for focusing the light beam deflected by said light deflector onto an object surface to be scanned, said second focusing optical system comprising:

a single anamorphic lens, a single spherical lens having positive refracting power, and a single lens having a toric surface, successively arranged in order from said light deflector toward said object surface;

wherein said anamorphic lens has a spherical lens surface facing toward said light deflector and a cylindrical surface facing toward said object surface, and is a plano-concave lens in the plane in which the light beam is deflected by said light deflector, and said anamorphic lens is a double-concave lens in a direction normal to said plane, and wherein said lens having a toric surface is a plano-convex lens in said plane of light beam deflection and a plano-convex lens in said direction normal to said plane;

said lenses having refracting surfaces having respective radii of curvature indicated respectively by r:1 and r:2 for said anamorphic lens, r:3 and r:4 for said spherical lens, and r:5 and r:6 for said lens having a toric surface, in order from said light deflector, and said lenses in said scanning optical system meeting the following condition:

$-1.0 < r:6Y/r:2Y < -0.3$ where Y is a component of each of the radii of curvature in a direction normal to a main scanning direction in which the light beam is deflected.

2. A scanning optical system capable of correcting deflecting surface irregularity, comprising:

a light source for emitting a light beam;

a first focusing optical system for focusing the light beam as a linear image;

a light deflector having a deflecting surface in the vicinity of the linear image formed by said first focusing optical system, for deflecting the light beam from said first focusing optical system; and a second focusing optical system for focusing the light beam deflected by said light deflector onto an object surface to be scanned, said second focusing optical system comprising:

a single anamorphic lens, a single spherical lens having positive refracting power, and a single lens having a toric surface, successively arranged in order from said light deflector toward said object surface;

wherein said anamorphic lens has a spherical lens surface facing toward said light deflector and a cylindrical surface facing toward said object surface, and is a plano-concave lens in the plane in which the light beam is deflected by said light deflector, and said anamorphic lens is a double-concave lens in a direction normal to said plane, and wherein said lens having a toric surface is a plano-convex lens in said plane of light beam deflection and a meniscus-convex lens in said direction normal to said plane;

said lenses having refracting surfaces having respective radii of curvature indicated respectively by r:1, r:2, r:3, r:4, r:5, r:6 in order from said light deflector, said lenses in said optical system meeting the following conditions:

$-1.0 < r:6Y/r:2Y < -0.3$ where Y is a component of each of the radii of curvature in a direction normal to a main scanning direction in which the light beam is deflected; and $1.8 < n_3 < 1.83$ where $n_3$ is a refractive index of the toric lens on an optical axis.

* * * * *